United States Patent [19]
Ajlouny

[11] 3,884,363
[45] May 20, 1975

[54] PROGRAMMABLE UNIVERSAL TRANSFER DEVICE

[75] Inventor: Nadim S. Ajlouny, West Bloomfield, Mich.

[73] Assignee: The Bendix Corporation, Southfield, Mich.

[22] Filed: Sept. 13, 1973

[21] Appl. No.: 397,036

[52] U.S. Cl. ............ 214/1 BB; 214/6 P; 294/103 R
[51] Int. Cl. ............................................. B65g 57/20
[58] Field of Search ............ 214/1 BB, 6 P, 16.4 B, 214/1 B; 294/103 R, 103 CG

[56] References Cited
UNITED STATES PATENTS

| | | | |
|---|---|---|---|
| 1,272,359 | 7/1918 | Bell | 294/103 CG |
| 2,918,656 | 12/1959 | Nolde et al. | 214/16.4 A X |
| 3,059,786 | 10/1962 | Lissimore | 214/6 P |
| 3,094,225 | 6/1963 | Repasuy et al. | 214/16 B |
| 3,272,364 | 9/1966 | Mindrum et al. | 294/103 R X |
| 3,543,910 | 12/1970 | Devol et al. | 216/6 P X |
| 3,586,176 | 6/1971 | Rackman | 214/6 P |
| 3,738,504 | 6/1973 | Vail et al. | 214/1.6 |
| 3,746,189 | 7/1973 | Burch et al. | 214/16.4 B |

Primary Examiner—Frank E. Werner
Attorney, Agent, or Firm—Lester L. Hallacher

[57] ABSTRACT

A trainable, automatic palletizing system for uniformly sized articles which arrive at a pickup station in sequence. A large quadrupedal frame supports a gripper and a triaxial positioning system comprising ball-nut and screwshaft devices controlled by digital servo loops. The gripper is attached to the lower end of a vertically depending arm and comprises upper and lower jaws for gripping articles. Gripping is accomplished by moving the upper jaw vertically relative to the lower jaw. Release is accomplished by sliding or pivoting lower jaw elements out from under the article. Training is accomplished by leading the gripper through a first transfer operation and entering critical position coordinates and other data into a random access digital computer memory. The system thereafter operates automatically under computer control, making incremental release position adjustments according to article dimensions, pallet size and desired stack height.

25 Claims, 22 Drawing Figures

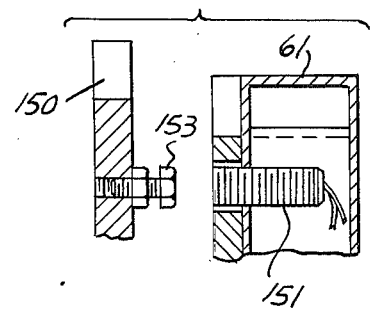
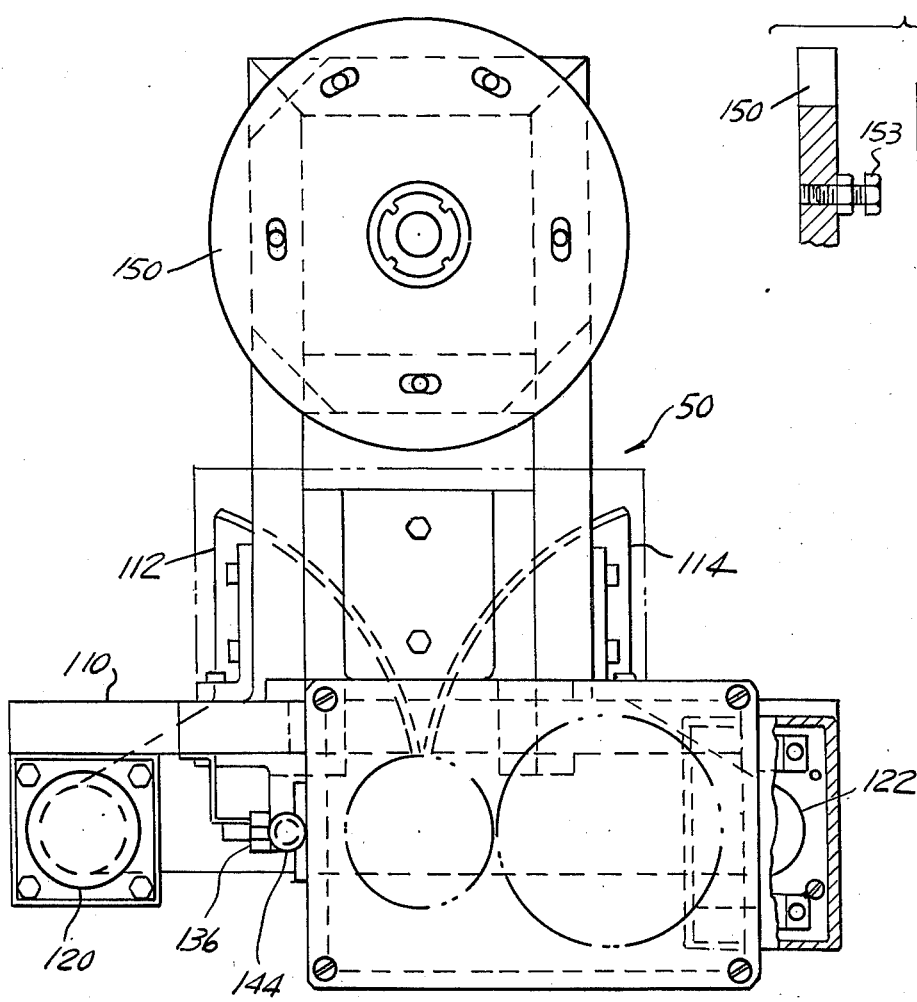
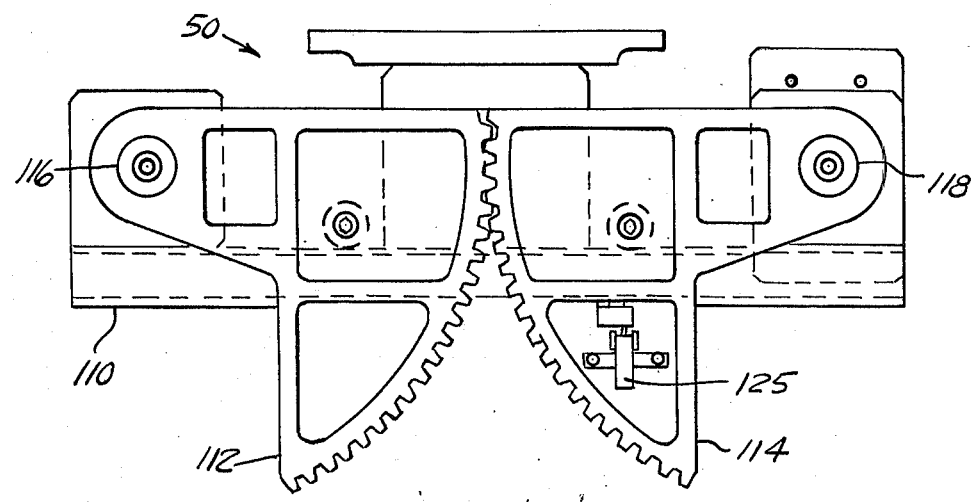

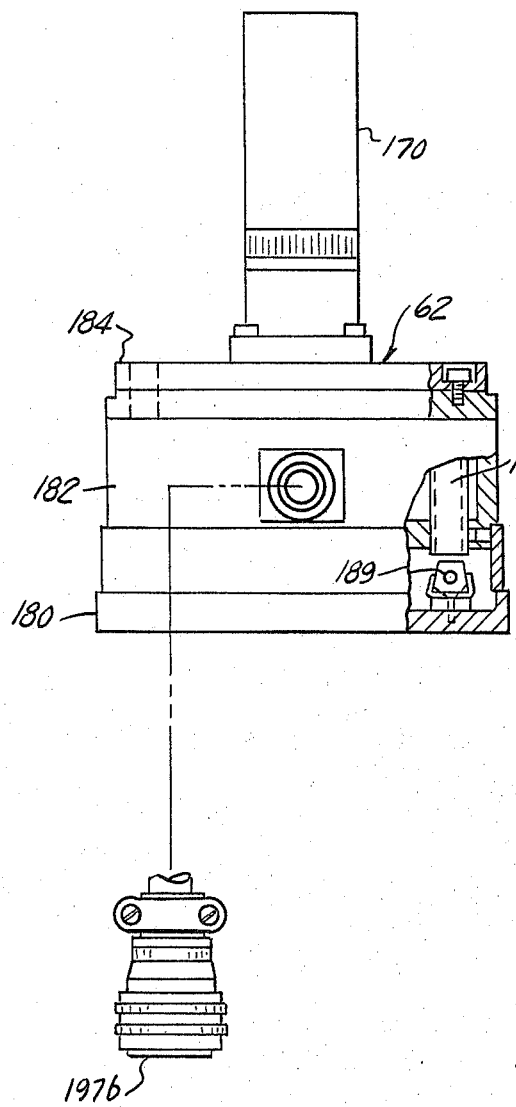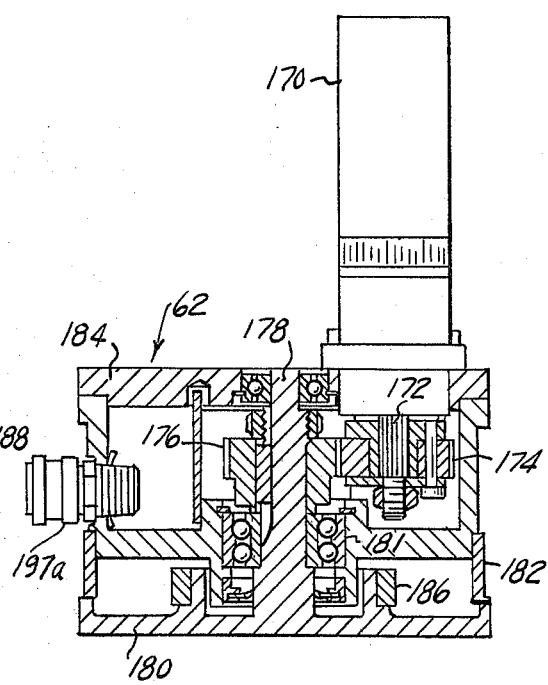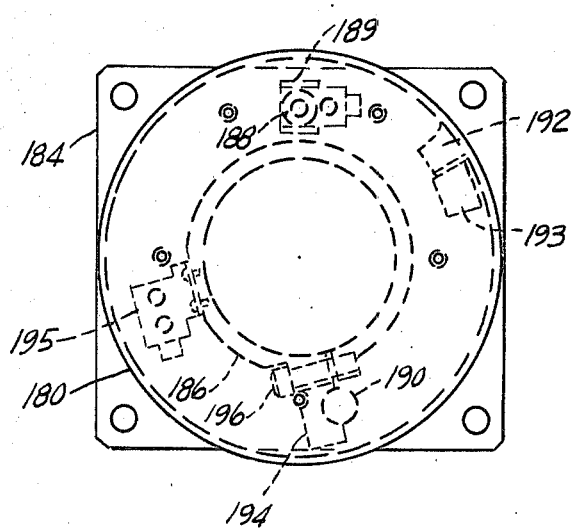

BUNDLES 24" IN LENGTH OR LESS

LAYER 1+3

LAYER 2+4

BUNDLES 25" TO 36" IN LENGTH

LAYER 1+3

LAYER 2 + 4

LAYER NO. 4 MAY BE OMM IN ANY OF THE EXAMPLES

BUNDLES GREATER THAN 36" IN LENGTH

LAYER 1 + 3

OFFSET 1/3 OF WIDTH

LAYER 2 + 4

PROGRAMMABLE UNIVERSAL TRANSFER DEVICE

INTRODUCTION

This invention relates to article transfer devices and particularly to an apparatus including an article gripper means and a position control system for programming the movements of the gripper means within a work area to perform a controlled transfer of articles from one point to another. In addition, the invention contemplates a method whereby articles may be systematically transferred from a pickup station to a stacking area and automatically stacked according to one of several stacking programs, the particular program being selected according to such input data as article size, stack support area, and stack height.

BACKGROUND OF THE INVENTION

Various types of article transfer and handling devices capable of remote control are disclosed in the prior art. Such devices are often thought of and designated as "robots" in that they simulate to some extent human functions and include, for example, gripper appendages for grasping various articles. These devices are often used where a repetitious article transfer is required and where the atmosphere around or character of the articles to be transferred is such as to present difficulties for human beings.

Once such prior art devices comprises a floor mounted tower from which a support system for the gripping means projects. Typically, the tower is capable of pivotal movement as well as vertical and horizontal movement and, in addition, the article gripper is supported on the end of an articulated arm comprising a plurality of pivotally connected components such that the gripper arm may be extended and retracted under operator control.

Mounting the position control tower on the floor beside the work area has the disadvantages of taking up a great deal of floor space and, because of the lateral projecting character of the arm, it is difficult, if not impossible, to place the article gripper into a working position or access points which is behind an obstacle such as a stack of parts. It is apparent that a laterally projecting gripper arm cannot reach behind an obstacle of significant height whereas an over-head gripper can easily do so. Another shortcoming of the articulated pivot arm in such prior art devices is the inherent difficulty in determining the position of the article gripper within a triaxial coordinate system. It is readily apparent that a very sophisticated system of transducers and calculators is required to determine the position in space of the end of a pivotal arm having two or more pivotally interconnected sections where that arm causes the gripper device to move in an arc rather than linearly and where the length of the pivot arm is a continuously varying quantity. Such problems occur even where pantographic, parallelogram devices are used.

The prior art article handling systems also appear to be characterized by a gripper means having a "tweezers" type mechanical assembly wherein opposing gripper jaws move pivotally relative to one another to grasp an article by a clamping or pinching motion. These gripper assemblies are typically limited in the size range of articles which they can accommodate and, moreover, require a particular orientation when releasing articles, since the tweezer jaws permit relative displacement only in an opposing fashion.

Accordingly, there exists a need for an article transfer apparatus having reduced floor space requirements, substantially unlimited access or positioning capabilities within the work area, simplified and accurate positioning capability, and an improved gripper structure.

BRIEF SUMMARY OF THE INVENTION

The present invention provides an article transfer apparatus capable of gripping and transferring various articles from one position to another within a work area, the device being constructed and arranged for overhead support so as to occupy a minimum of floor space and also to provide maximum variability in positioning and article access within the work area. In general, this is accomplished by means of an article gripper support assembly which is specifically arranged for overhead suspension, either by means of a floor mounted framework or ovehead dependency, the gripper means being disposed on the lower end of a vertically displaceable rigid arm or boom. In addition, the invention contemplates a positioning system for causing the gripper means to be linearly bidirectionally displaceable along each of three axes, these axes typically bieng mutually perpendicular and defining a triaxial Cartesian coordinate system for accurate and rapid position control.

In accordance with the invention, all positioning displacements of the gripper are essentially linear and parallel to the axes of measurement thereby to simplify the transducer and control apparatus and eliminate the need for complex pivotal connections between articulate arms. In the preferred embodiment of the invention hereinafter described, the linear displacement positioning means comprises a plurality of screw shaft and traveler nut arrangements orthogonally oriented along each of three mutually perpendicular axes to drive the vertically depending gripper arm to selected positions on each of two normally horizontal axes and also to position the support arm vertically. This permits the gripper means to be accurately positioned at any location within a work space simply by specifying and executing each of three position commands.

The present invention further provides an improved gripper assembly having a large size range of articles which may be accommodated as well as an improved grasping and releasing capability. In general, this is accomplished by means of a gripper assembly which is normally disposed on the end of a vertically displaceable support arm and having upper and lower opposing jaws which are vertically displaceable relative to one another. In addition, the lower jaw is horizontally displaceable between article-engaging and article-releasing positions which are spaced apart in a horizontal plane; i.e., a plane which is normal to the axis of opposed displacement between the jaws. Accordingly, an article may be released simply by causing the lower jaw to slide out from under the article once the gripper assembly has been placed in the predetermined destination position.

Further features of the gripper assembly described in the following description of the specific embodiment include a novel structural arrangement for a gripper device including a "wrist" action capability, a mechanical decoupling between the gripper jaw frame and the support arm, thus, to improve positioning accuracy by limiting opposing jaw motion to the upper jaw only, current-sensing pressure control means for regulating the grasping pressure exerted by the gripper jaws on an article, the mechanically adjustable limit switch arrangement for presetting the open and closed positions of the jaws which represent the limits of extension for a given article transfer procedure, and other features hereinafter described in detail.

The present invention further contemplates the provision of programmable means for receiving and storing various data including coordinates of pickup and release positions, article size, pallet size (where articles are to be deposited onto a pallet or like device), stack size, stack height, and so forth. In addition, the programmable feature of the subject invention permits the storage of not only a basic article transfer program, but also a plurality of varying article stacking patterns such that the most appropriate stacking pattern may be selected for the size and shape of the articles being stacked. In the preferred embodiment, the selection of the stacking program is carried out by the article transfer apparatus in an automatic fashion based on criteria hereinafter described so as to produce such desirable end results as maximum usage of space and stability in the final article stack.

BRIEF DESCRIPTION OF THE DRAWINGS

FIG. 4 is a bottom view of the article gripper device;

FIG. 5 is a detail of the gripper device;

FIG. 6 is a plan view of the lower jaw arrangement of the gripper device;

FIG. 8 is a side view of the wrist rotation actuator assembly for the gripper device;

FIG. 9 is a sectional view of the wrist rotation actuator assembly;

FIG. 10 is a bottom view of the wrist rotation assembly;

DETAILED DESCRIPTION OF THE SPECIFIC EMBODIMENT

FIG. 1

Figure 1:
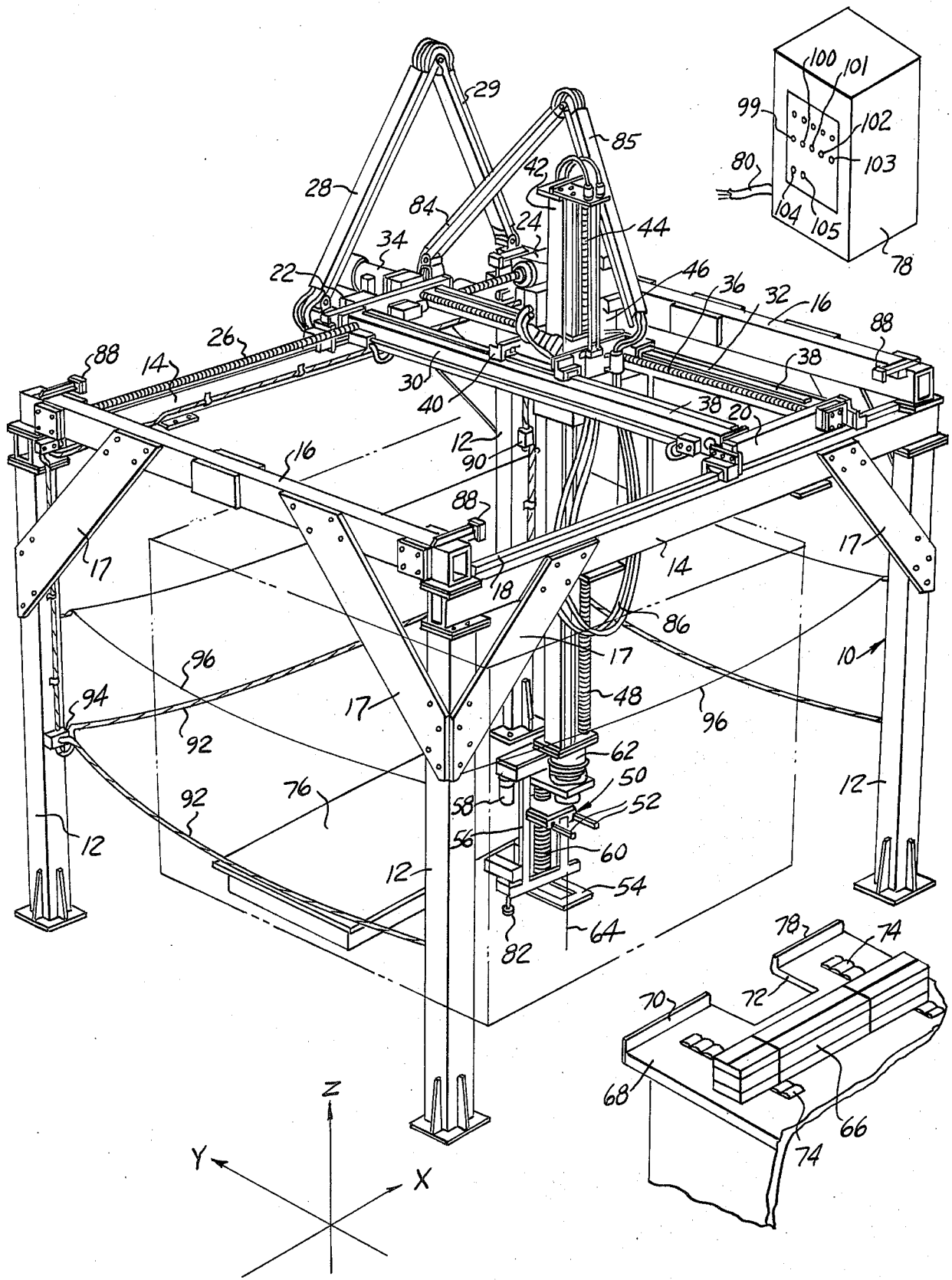
FIG. 1 is a perspective drawing of an illustrative embodiment of the article transfer apparatus illustrating the relative configurations of the gripper assembly, support means, control system, and article pickup and release stations.

Looking now to FIG. 1, the illustrative embodiment of the invention is shown to comprise a large, rigid, gradrupedal frame 10, providing overhead support for a positioning system for accurately positioning a gripper means 50 within a cubical work space and according to a triaxial cartesian coordinate system identified by the axis references X, Y, and Z in FIG. 1. Gripper means 50 is specifically adapted to grasp and transfer articles such as banded lumber bundles 66 between a first station defined by a work table 68 and a second station defined by a floor mounted pallet 76. The program of displacements of the gripper means 50 throughout the work area in transferring articles 66 from table 68 to the pallet 76 is provided and controlled by a control unit 78 which is connected to the positioning system for digital data transfer therewith by a cable 80. Control unit 78 is preferably of the tape comprising a small, general-purpose, programmable, digital computer for performing simple calculations and data management functions as hereinafter described in greater detail.

Describing the apparatus of FIG. 1 in greater detail the quadrupedal frame 10 is shown to comprise four widely-spaced rigid and vertically oriented legs 12 of approximately 8 to 10 feet in length and supporting at the upper end thereof a pair of rigid cross beams 14 which are parallel to the X-axis. Beams 14 in turn support the hollow but rigid channel members 16 which are parallel to the Y-axis. Diagonal brace members 17 are provided to rigidify the entire frame assembly. Beams 14 define ways 18 for roller type trolley assemblies 20 and 22 which are adapted to carry the gripper means 50 and the positioning apparatus associated therewith back and forth across the work area along the X-axis in accordance with the selected actuation and direction of movement of servo control motor 24. The motor 24 is connected to drive a long, fixed position screw shaft 26 which extends parallel and adjacent to beam 14. Screw shaft 26 mates with a traveling nut (not shown) which is restrained against rotation by trolley assembly 22 to produce linear movement of the trolleys 20 and 22 along the X-axis in accordance with a position command applied to the servo control system which includes motor 24, such system being more fully described with reference to FIG. 11.

Trolleys 20 and 22 are interconnected by a pair of cross beams 30 and 32 which parallel channels 16 but which are less widely spaced apart than channels 16; e.g., channels 16 may be 8 to 10 feet in spacing while beams 30 and 32 are about 18 inches apart. The support assembly comprising beams 30 and 32 and trolleys 20 and 22 carries a second servo control system including a motor 34 which is operatively connected to rotate a second elongated and fixed position screw shaft 36 which extends parallel to the Y-axis. Screw shaft 36 operates in conjunction with a second tapped traveler nut (not shown) to provide linear displacement of a trolley assembly 40 along ways 38 which are disposed on the beams 30 and 32 and parallel to the Y-axis. Again, the quantity of displacement of the assembly 40 which is produced by the servo motor 34 is dependent upon the character of a position command which is applied by controller 78 to the servo loop of which motor 34 is a part.

Trolley assembly 40 supports a rigid vertically depending arm 42 of approximately 8 feet in length and which carries the gripper means 50 on the lower end thereof. Arm 42 carries thereon a screw shaft 44 which is fixed in augular position and which carries in operatively meshing engagement therewith a third nut (not shown) which may be rotatively driven by a motor 46. Motor 46 is part of a third servo control loop which determines the vertical (Z-axis) position of the gripper means 50 relative to the frame 10 in accordance with a position command received from the controller 78. Part of the screw shaft 46 is covered by an accordion-type cover 48 to protect the threads against damage for reasons which will be apparent to those knowledgeable with machine parts and the like.

Gripper means 50 carried at the lower end of vertical rigid support arm 42 comprises upper and lower jaw means 52 and 54, respectively, which are disposed in vertically opposing relationship on a vertically depending rigid frame 56. Jaw means 52 and 54 may be power driven together and apart in the opposing relationship by means of a motor 58 which is connected for open loop control by control unit 78 and further by a system of pressure control means and limit switch means hereinafter described in detail with reference to FIG. 2. The motor drive train comprises a screw shaft 56 which is threadedly engaged with the upper jaw means 52 so as to drive the upper jaw means vertically upwardly and downwardly relative to the lower jaw means 54 to grasp and release the articles 66 at the proper time. In addition, the gripper means 50 is mounted on the end of the arm 42 by wrist-action unit 62 so as to provide predetermined selective rotation of the gripper means 50 about a vertical axis 64 whenever it is desired to rotate an article 66 through some predetermined angle prior to depositing it on the pallet 76.

Looking now to the first station in greater detail, it can be seen that the article 66 is a banded bundle of lumber strips, such bundles being received one at a time in a serial sequence on the work table 68. Each bundle or article 66 is caused to be displaced over rollers 74 toward the frame 10 until it engages bumpers 70, thus, to overlie a cutout 72 in the work table 68. The cutout 72 permits the lower jaw means 54 to extend under the bundle or article 66 to lift the article 66 off of the work table 68. Upper jaw means 52, of course, works in opposing relationship to the lower jaw means 54 to clamp the article 66 therebetween to secure the article for transfer to the pallet 76 in accordance with the position commands generated in the controller 78. These position commands are, of course, produced in such sequence as to lift the article 66 clear of the bumper 70 along the Z-axis to transfer the article 66 along the X and Y axes until it is disposed over the pallet 76, to lower the article to a point near the pallet surface and then to release the article onto the pallet. The program or sequence of displacements of gripper device 50 back and forth between the work table or pickup station 68 and the pallet or drop-off station 76 is preferably incrementally varied so as to stack the articles 66 in a distributed fashion over the surface of the pallet 76. As will be apparent to those skilled in the art, such an incrementally varying sequence of controlled displacements may be produced by a suitable servo position control system for producing position commands according to signals received either from a "hard" storage facility, such as punched tape, or from a "soft" storage facility, such as the memory of the digital computer. In addition, the system of FIG. 1 preferably orients the bundles 66 relative to the axis of gripper rotation 64 so as to interleave alternate layers on the pallet 66 to produce a stable stack of otherwise discrete articles. Again, such motion may be controlled by position commands and by commands which initiate operation of the wrist action control unit 62 in a fashion hereinafter described.

In summary, it can be seen that the system of FIG. 1 provides three closed-loop servo control systems for positioning the gripper means 50 within the cubical work area in accordance with respective X, Y, and Z axis position commands. In addition, open-loop positioning functions are carried out through the jaw means 52 and the wrist action control assembly 62 to properly position the gripper means and the various components thereof. The servo control mechanism for determining the Z-axis position of the gripper means 60 is subject to override by means of a limit switch type probe 82 which depends from the gripper means 50 should the surface of the pallet 76 or stacking tier immediately beneath the gripper means 50 be higher than that which is contemplated by the programmed sequence of displacements. This may, for example, occur where the tolerance build up on the stacked articles 66 is greater than expected, thus, to raise the surface of the top tier to a point which is higher than the normal variations afforded by the position program sequence.

Describing now some of the details of the system of FIG. 1, hollow arms 28 and 29 are pivotally connected between the channel 16 and the trolley 22 along the cross beam 14 to carry the electrical cables which extend between the control unit 78 and the servosystems which include motors 24 and 46. This keeps the cables up out of the way of the linearly translating machine elements as well as out of the way of the stacked articles and the personnel working with the subject device. Similarly, hollow arms 84 and 85 are pivotally connected between the trolley assembly 22 and the trolley assembly 40 which moves along beams 30 and 32 to carry the electrical cables which interconnect the control unit 78 and the servosystem of which motor 46 is a part. Accordingly, these cables are kept up out of the way as the trolley assembly 40 traverses linearly back and forth along the Y-axis in accordance with the sequence of position commands. The cables 86 which connect the electrical position control signals to the Z-axis drive component are loosely looped as it is necessary for such cables to accommodate the vertical travel of the arm 42 in providing Z-axis displacement of the gripper means 50. Limit stop devices 88 may be disposed on the channels 16 at opposite ends thereof to mechanically limit the travel of the cross beams 30 and 32 in the X direction and also to break the servo control over X-axis displacement as necessary to prevent damage to the system. Similar limit stops may be provided for the Y and Z axis of travel, a vertically positionally adjustable limit switch for Z-axis control being shown at reference character 90.

For safety, the substantially cubical volume within the quadrupedal frame 10 is ringed on three sides by safety gate chains 92 which are connected into breaker boxes 94 on two of the legs 12 so as to interrupt power to any and all of the positioning control system in the event any of the safety cords are pulled so as to disengage from the breaker boxes 94. This facility operates very much in the manner of a safety cable on a ski tow to simply "pull the plug" on the entire system should someone inadvertently or purposely run through one of the safety gates 94. A similar arrangement may be provided by means of the emergency pull cord 96 which is strung along the entire periphery of the work area and interconnected with suitable apparatus such as a limit switch in a manner which will be apparent to those skilled in the electrical control arts.

Referring again to FIG. 1, the control unit 78 is shown to comprise a control panel 98 having pushbutton controls 99, 100, 101, 102, and 103 for manual operation of the servo drives along the X, Y, and Z axes, the vertical travel of the upper gripper jaw and the wrist action for the gripper, respectively. Speed control for all of the servo motors in the X, Y, and Z axes is governed by means of a thumbwheel switch 104. A pushbutton 105 is provided for placing the control unit 78 in a "training" mode as hereinafter described in greater detail. Each of the pushbuttons 99 through 103 has associated therewith a rotatable bezel dial for inputting direction information for the particular displacement quantity.

FIGS. 2-6 — THE GRIPPER DEVICE

FIGS. 2 through 6 show a gripper means 50 which is generally similar to the gripper means 50 of FIG. 1 but i modified particularly with respect to the details of the lower jaw. Accordingly, where like but not identical parts are involved, those parts have been identified in FIGS. 2 through 6 with the same reference character as is used in FIG. 1 but with a "prime" mark to indicate some degree of difference.

Figure 2:
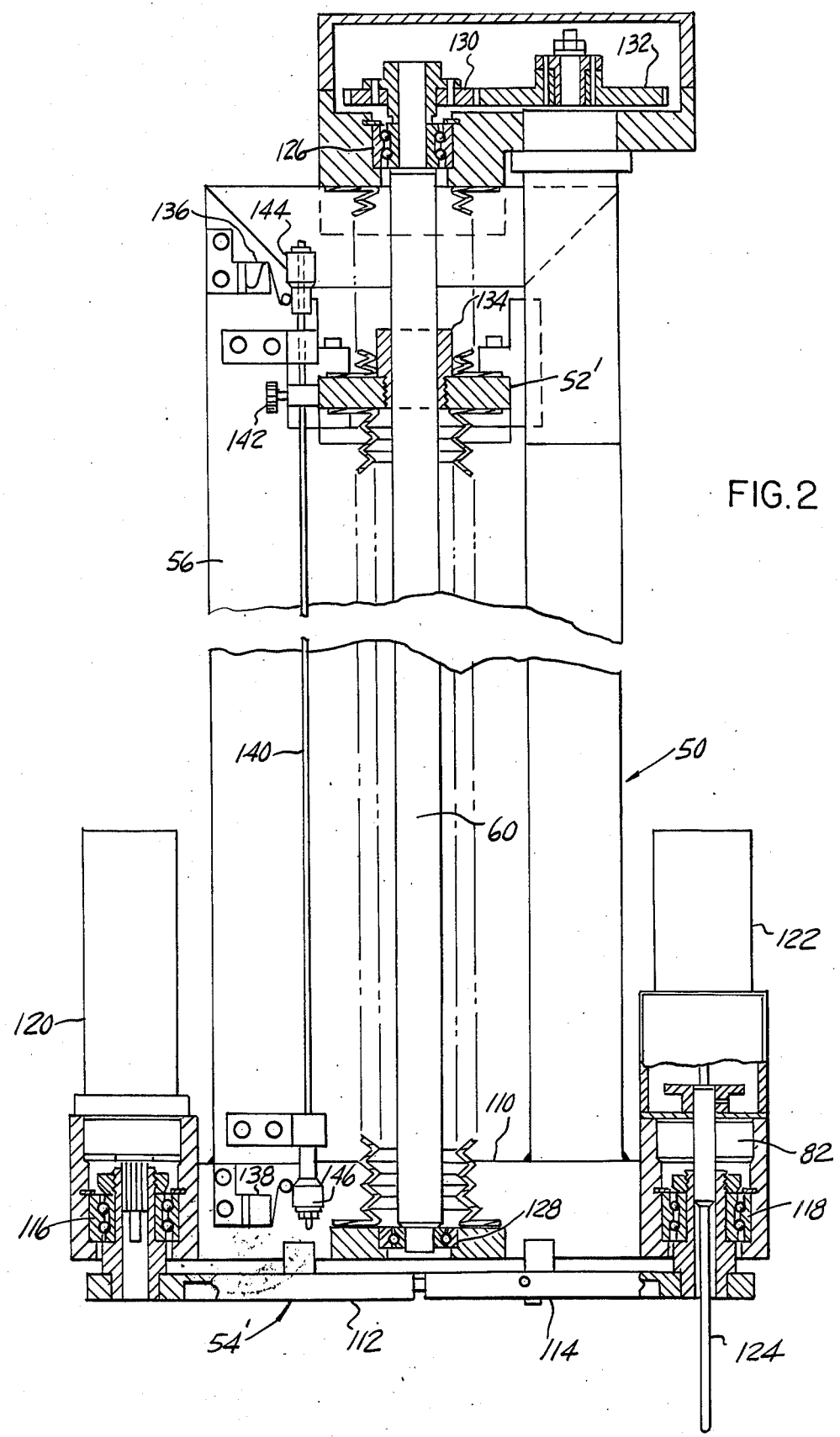
FIG. 2 is a detailed front view, partly in section, of a gripper assembly for the ilustrative embodiment of FIG. 1.

In FIGS. 2 through 6 the gripper means 50 is shown to comprise a vertically elongate and depending rigid frame 56 carrying a rigid crossbar 110 at the lower end thereof. Crossbar 110 supports in pivotal relation therewith the lower jaw means 54' which in FIG. 2 is shown to comprise a pair of sector-shaped plates 112 and 114. Each of the plates 112 and 114 has a toothed arcuate edge thereon, the two arcuate edges engaging one another in the manner of meshing gears such that the two sectors are caused to move in synchronism about pivots 116 and 118, respectively. A motor 120 mounted on the crossbar assembly 110 drives sector plate 112 about pivot 116 between a first position wherein the lower jaw means 54' vertically opposes the upper jaw means 52' and a second position wherein the lower jaw means 54' is effectively drawn horizontally out from under the upper jaw means 52'. This later position, of course, corresponds to the position in which the articles are released. Obviously, only one motor is required since the meshing engagement of the two sector-shaped plates 112 and 114 causes them to move together.

A housing 122 disposed on the right side of the crossbar assembly 110, as shown in FIG. 2, carries a probe assembly 82 having a depending actuator 124 which is spring biased into a switch unit to act in the manner of a limit switch. Switch assembly 82' is electrically connected in series circuit with the Z-axis servo drive system hereinafter described to interrupt downward displacement in the Z-axis direction in the event the support surface on which the article is to be released is higher than that which was assumed at the time the programming was prepared for controller 78. Although not specifically described herein, it is apparent that switch assembly 82' may also be wired to provide a "pallet present" signal which must be received by the controller 78 before an article being carried in the gripper jaws will be released. This operates to ensure that the load is not released on the basis of the gripper assembly having reached the programmed position but wherein there is actually no support means, such as the pallet 76, to receive it. A second similar probe 125 is located in a pocket on the underside of sector plate 114, as shown in FIG. 6, to sense surfaces immediately beneath the jaws 54'.

Screw shaft 60 is rotatively connected between upper and lower bearing assemblies 126 and 128, respectively, and is driven through gear set 130, 132 to cause a nut 134 to travel vertically along the screw shaft as it is rotated. The nut 134 is mechanically connected to the upper jaw means 52' to cause it to move in vertical spacing relative to the lower jaw means 54'.

The upper and lower extremes or limits of displacement for the upper jaw means 52' may be set by means of limit switches 136 and 138 carried on the frame 56 at upper and lower extremities thereof. The switches 136 and 138 are tripped by cams 144 and 146 on opposite ends of a vertically oriented rod 140 carried with upper jaw 52'. The position of rod 140 relative to jaw 52' may be adjusted by means of thumbwheel screw clamp 142 so as to establish circuit breaking operations at upper and lower limits of travel.

The gripper assemblies 52 and 52' illustrated in the FIGURES provide the clamping action for article gripping by controlled vertical displacement of only the upper jaw; i.e., the lower jaw 54' strictly follows the Z-axis position commands and is not independently displaceable along the Z-axis. Thus, one programs a pickup operation by programming the lower jaw means 54' to the known height of the surface of work table 68. As a practical matter, however, the programming of an article pickup operation at the work table 68 must allow a small clearance between the support surface of the lower jaw means 54 and the bottom of the article 66 to be picked up. This clearance in the normal programming operation may be fairly precise since the position or vertical elevation of the work table surface is normally very precisely known and not subject to variation. Clearances on the order of one-quarter to three-eighths of an inch are practical. It can be seen, however, that as the upper clamping jaw is caused to move downwardly against the upper surface of the article 66 to be grasped, a rigid coupling between the gripper means 50 and the rigid arm 42 would simply result in the application of a downward pressure to the top of the article 66 and the bottom jaw 54' would not engage the load. Accordingly, there would exist a danger that the article 66 would fall out of the gripper means as soon as there was an attempt to lift it off the work table 68.

Figure 3:
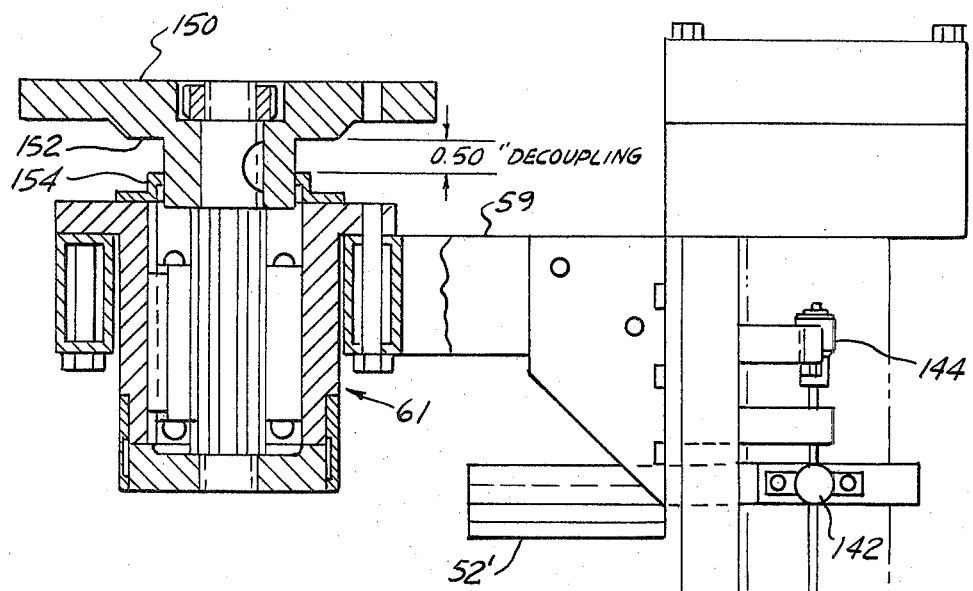
FIG. 3 is a side view, partly in section, of the article gripper device of FIG. 2.

To overcome these problems, the frame 56' is connected as best shown in FIG. 3 to an arm 59 which is connected to a splined connector assembly 61 including an adaptor plate 150 so as to provide a lost motion connection. In other words, the splined connector assembly 61 provides on the order of one-half of an inch of play or decoupling between the lower surface 152 of plate 150 and the dust seal 154 on the assembly 61 so that the downward displacement of the upper jaw means 52' against the article 66 to be grasped simply causes the entire gripper means 50' to raise until the lower jaw clearance has been taken up and both jaws are fully engaged with the article 66 to be grasped.

As hereinafter described with reference to FIGS. 7 and 12, the pressure which is exerted by the gripper jaws 52 and 54 on the article 66 to be grasped is controlled by sensing the current which is applied to the motor which drives the upper jaw along the screw shaft 60 and open circuiting the motor in an open-loop fashion whenever a predetermined current is sensed. As will be apparent to those skilled in the art, the current which is drawn by any small dc motor tends to rise as the motor approaches a stall condition and this phenomenon is relied upon for pressure sensing in the present invention. Other means may, of course, be employed.

FIG. 5 shows a sensor 151 of the electromagnetic proximity type disposed opposite a threaded nut and bolt combination 153 on plate 150 to sense overtravel in the decoupled combination of plate 150 and the underlying assembly 61 and to shut down the Z-axis drive in the event the entire one-half inch of lost motion is taken up before the gripper jaw motion is terminated during the gripping of an article. Of course, switch 151 may terminate Z-axis drive operation at any time, irrespective of the gripping of articles.

FIG. 7

Figure 7:
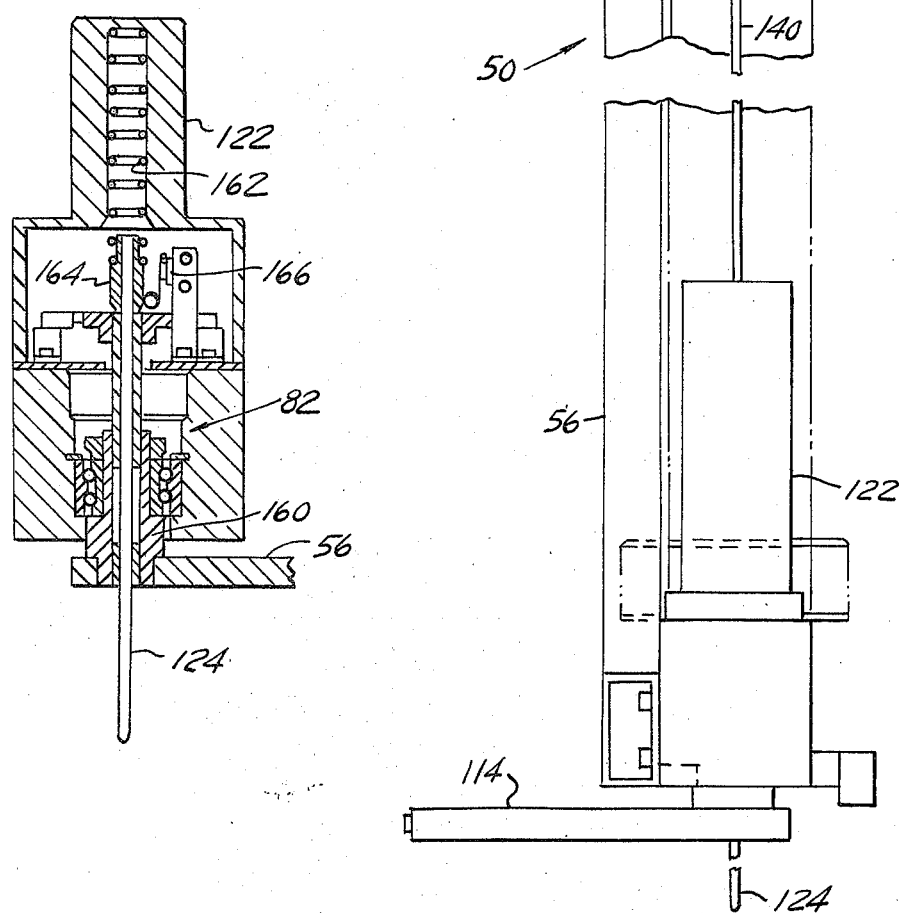
FIG. 7 is a sectional view of a probe for use with the gripper device of FIG. 2.

The probe assembly 82 of FIG. 7 is mounted on the frame 56 of the gripper means 50' to sense the presence of the support surface on which the article being carried is to be placed. It sometimes happens that this surface is higher or lower than expected. If higher, the Z-axis servo system might continue to generate a position error signal to drive the arm 42 even though the system was stalled by contact between the gripper and the support surface. If lower, the Z-axis position might be reached while the gripper was well above the support surface and the carried article dropped through too large a distance.

To sense the support surface being approached, the probe assembly 82 comprises an elongate probe 124 disposed within a tubular guide 160 and extending about two inches below the gripper 50. Within housing 122 a return spring 162 is held in a cylindrical receptacle aligned with the probe 124 to urge the probe to the extended position. Probe 124 carries at the upper end a cam-type actuator 164 which engages the arm of a conventional limit switch 166 to open at electrical circuit whenever the probe 124 is caused to be displaced upwardly into the housing 122. This open circuit normally stops the Z-axis drive as hereinafter described.

A second limit switch (not shown) may also be placed within the assembly 82 to generate a "pallet present" signal whenever the gripper approaches the pallet 76 or the upper surface of any article thereon. The computer in controller 78 may be programmed to scan for this signal as the Z-axis position is reached and to disable the release operation instrumentalities until the signal is received. Alternatively or additionally, the "pallet present" signal may be generated by a floor switch beneath the pallet 76.

FIGS. 8 – 10 — WRIST MOTION ACTUATOR

In FIGS. 8 through 10, the wrist actuator unit 62 is shown to comprise a motor 170 having a splined output shaft 172 connected to a drive gear 174. Gear 174 meshes with driven gear 176 keyed on center shaft 178 of output member 180. a resilient dust shield 182 spans the peripheral gap between a rotatable output member 180 and stationary plate 184 which carries motor 170. Bearing 181 provides for relative rotation between members 180 and 184. Plate 180 is connected to adaptor plate 150 of FIG. 3 to integrate unit 62 with gripper 50'.

Output member 180 carries a zero position stop 192 which cooperates with fixed stop 193 on plate 184 to mechanically stop rotation of member 180 at a fixed reference position. A positive signal indicating the zero position is provided by electromagnetic sensor 188 carried by plate 184 and an actuator 189 mounted on member 180. A variable "end-of-travel" position is provided by stop ring 186 which is clamped around the hub of output member 186 to rotate therewith. The angular position of ring 186 may be varied in the clockwise direction as seen in FIG. 10 to increase allowable wrist motion. Ring 186 carries an end-of-travel stop 194 which hits fixed stop 193 at the end of allowable travel. This position is also positively indicated by switch 190 mounted on plate 184 and actuator block mounted on ring 186 to rotate therewith. The normal 180° limit of travel may be mechanically altered by loosening clamp screw 196 and rotating the stop ring 186 to the desired limit position. A cable and connector assembly 197a and 197b is provided for taking power from assembly 62 to the gripper 50. A wrist position lock function is effected by maintaining low motor current at all times to hold the mechanical stops together.

FIG. 11 — POSITION CONTROL SERVO SYSTEM

Figure 11:
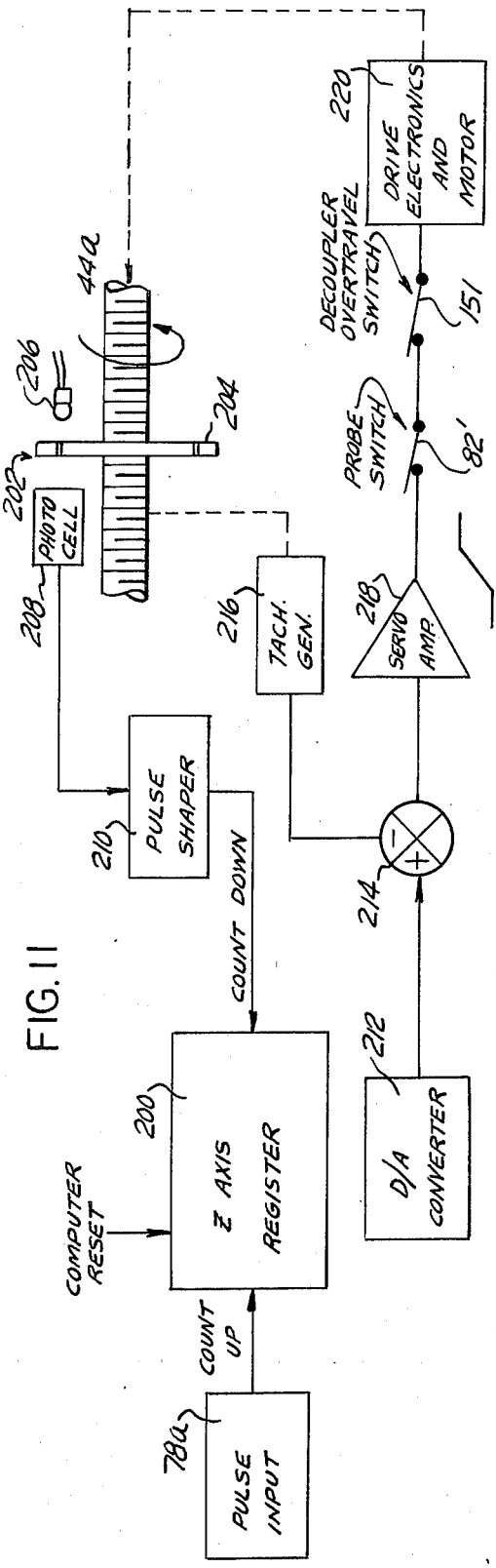
FIG. 11 is an electrical system diagram of a position control system for one axis of controlled displacement of the gripper means.

FIG. 11 illustrates in block diagram the servo control loop for the Z-axis; i.e., the vertical axis of the assembly of FIG. 1 for determining the vertical position of the gripper assembly 50 within the cubical work area defined by the frame 10. It is to be understood that while the servo control loop for the Z-axis has been selected for purposes of illustration, the X and Y-axis servo mechanisms are substantially identical except for such details as limit switches and other override mechanisms as will be apparent to those skilled in the art.

In FIG. 11 a digital register 200 is connected to receive pulses from an input device 78a which forms part of the controller 78 of FIG. 1 and may be implemented in a variety of forms to produce discrete pulses in selectible numbers. In the present example, it is contemplated that forty pulses or "counts" represent one inch of linear travel of the gripper assembly 50 within the triaxial coordinate system. The register 200 is also connected to receive discrete pulses from an optical encoder assembly 202 which comprises a slotted disk 204, mechanically connected to the rotating element 44a of the drive shaft 44, illustrated in FIG. 1 for controlling the vertical position of the gripper assembly 50. While the drawing of FIG. 11 suggests connection to a shaft, it is to be understood that the encoder disk 204 may be connected to the nut or whichever of two relatively rotating and linearly displacing elements is caused to rotate relative to the support frame 10 or the equivalent. Disk 204 is disposed between a small light source 206 and a photocell 208 which receives intermittent light pulses as the encoder disk 204 rotates with element 44a. The output of photocell 208 is connected into a pulse shaper 210 to form discrete pulses for application to the register 200. While the pulse input from unit 78a increments the register 200 in one direction, the pulses from pulse shaper 210 increment the register in the other or opposite direction. Accordingly, the output of the register 200 is a digital quantity, in binary-coded decimal form, representing the difference between the input pulse count quantity and the actual travel of the gripper 50 in the Z-axis direction in response to a given command. The output quantity becomes smaller and smaller as the gripper assembly approaches the commanded position; i.e., travels through the commanded quantity of displacement. The binary-coded decimal signal quantity is applied to a digital-to-analog converter 212 which converts the displacement difference signal into an analog quantity and applies this quantity to one input of an adder 214. The output input of adder 214 is connected to receive the output of a tachometer generator 216 which is mechanically connected to the rotating element 48a to develope a rate signal as will be apparent to those familiar with position feedback systems. The output of adder 214 is a position error signal and is applied to a servo amplifier 218 having a low gain, high lag transfer characteristic in the servo control loop. The output of control amplifier 218 is applied directly to the drive electronics 220 associated with the Z-axis drive motor 46. Accordingly, the feedback error signal causes the motor to rotate the driven element 44a until the error signal is zero; i.e., the commanded displacement has been executed.

As shown in FIG. 11, the output of the servo amplifier 218 may be connected to the drive electronics unit 220 through the series combination of the normally closed probe switch 82' and the normally closed decoupler over-travel switch 151 which is disposed in the unit 61, illustrated in FIG. 3. Depression of the probe 124 into the associated housing causes probe switch 82' to open and has the effect of cutting off the excitation signal to the Z-axis drive motor 46. Opening switch 151, of course, has a similar effect. It will be apparent to those skilled in the art that the representation of the switches in FIG. 11 is highly simplified and solid-state devices including relay circuit equivalents may be incorporated in a commercially practicable system.

The servo control circuit of FIG. 11 is, for all practical purposes, a digital counterpart of the well known phase analog control loops which are used in numerical control system for precise position control. It is desirable, however, that the overall transfer characteristic of the servo loop of FIG. 11 exhibits a high lag, low gain characteristic such that the linear velocity of the driven elements naturally decreases as the commanded position is closely approached. This eliminates the need for sophisticated deceleration control programs and the like.

FIG. 12 - GRIPPER JAW CONTROL CIRCUIT

Figure 12:
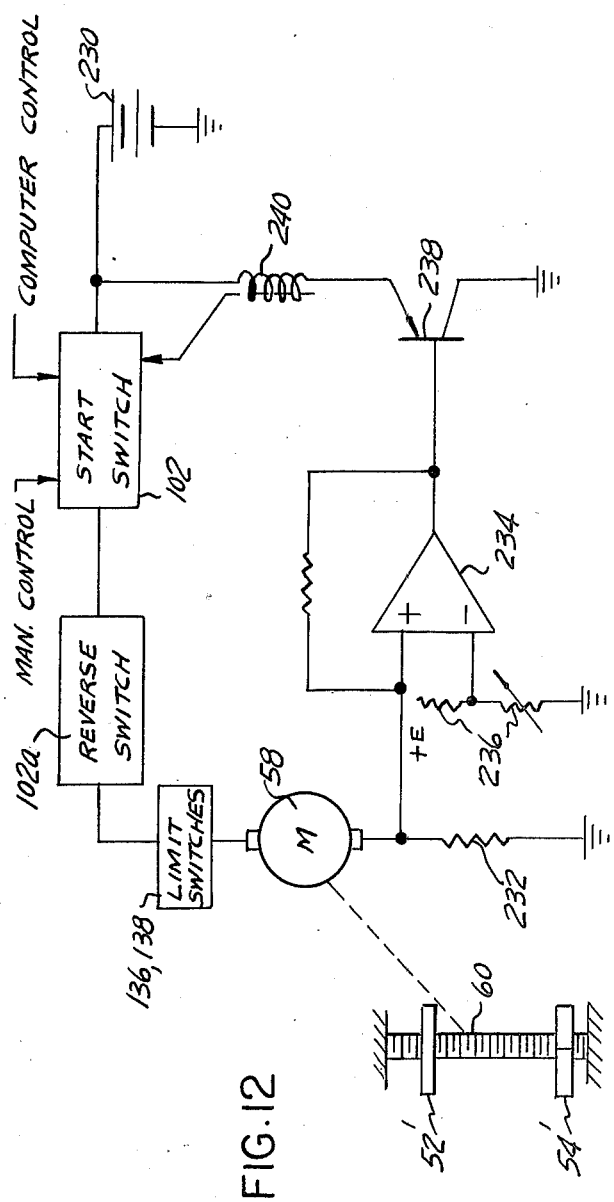
FIG. 12 is a circuit diagram of the gripper pressure control system.

Looking now to FIG. 12, there is shown an illustrative circuit for controlling the relative motion between upper and lower gripper jaws 52' and 54' by way of the reversible motor 58. The circuit comprises a start switch 102 on the control panel of controller 78 connected in series circuit with a reversing switch 102a to apply an energizing voltage from source 230 to the armature circuit of the motor 58. The motor 58 in turn rotates the screw shaft 60 to cause the upper jaw 52' to move vertically relative to the lower jaw 54' of the gripper assembly 50. Start switch 102 is subject to manual control to permit a human operator to open or close the jaws of the gripper device 50 at any time. Start switch 102 is also subject to computer program control so as to open and close the jaws of the gripper device under computer program control and in response to the meeting of predetermined conditions; e.g., the attainment of commanded position coordinates along all three controlled axes. The armature circuit for motor 58 also includes the limit switches 136 and 138 mounted on the frame 56, as shown in FIG. 2. Accordingly, the armature circuit is opened whenever the upper and lower limits of travel are reached.

The armature circuit of motor 58 is connected in series with a signal forming resistor 232 to develop a voltage related in amplitude to armature circuit current. This voltage is connected to one input of an operational amplifier 234 connected to function as a comparator. The other input to amplifier 234 is received from a voltage divider network 236 of which at least one resistor is variable to establish a threshold or reference value. The output of amplifier 234 goes negative whenever the input from the motor circuit exceeds the absolute amplitude of the reference signal from resistor voltage divider 236. Because of the inverting characteristic of the amplifier 234, this negative going signal tends to forward bias a PNP control transistor 238 and cause current to flow through the solenoid coil 240. The coil operates directly on the start switch 102 to open the holding circuit for the start switch and shut off the excitation current to the armature circuit of motor 58.

Accordingly, gripper pressure is controlled directly by the monitoring of armature circuit current, it being understood that such current tends to rise exponentially as the motor reaches the stall condition.

FIG. 13 — METHOD OF OPERATION

Figure 13:
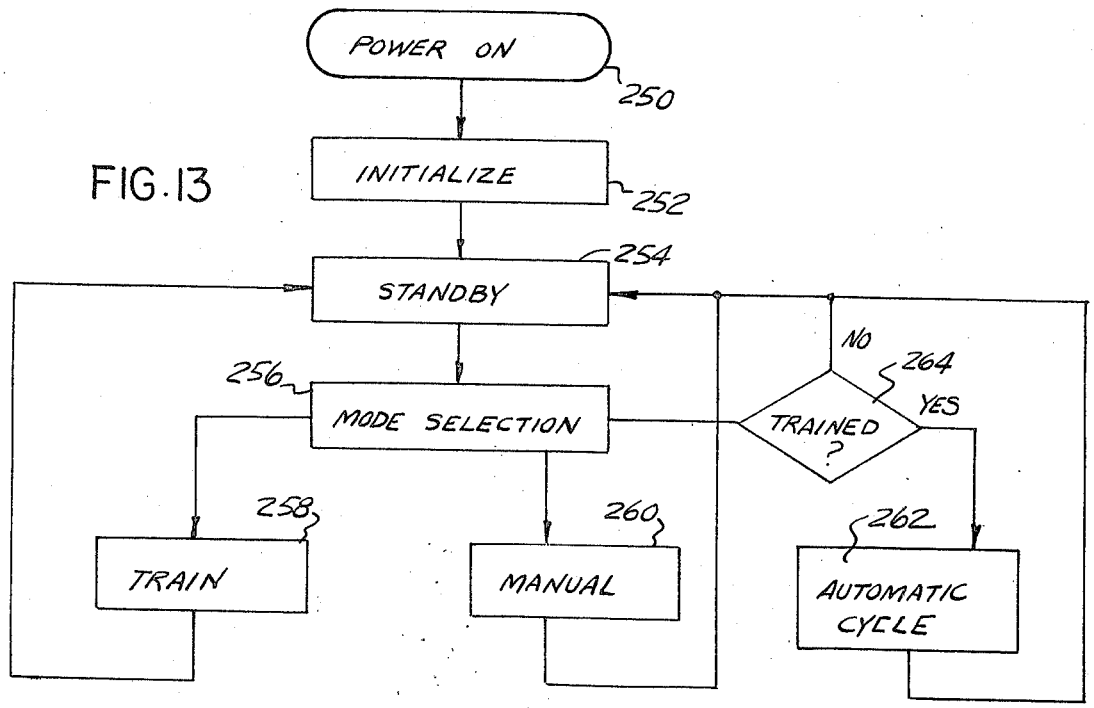
FIG. 13 is a flow chart of a basic article transfer procedure which is followed during operation of the subject device.

FIG. 13 illustrates in generalized form and terms a method of operation for the system of FIG. 1. The flow chart of FIG. 13 includes an initial function block 250 indicating simply that suitable electrical power must be readied for application to the various electromotive power sources of the positioning system and to the controller 78 including any general-purpose digital processor which may be included therein. It should be understood that a preferred digital processor is of the type generally referred to as a "mini computer," typically a general-purpose programmable digital computer such as the DPD-8 having a random accessed magnetic memory of at least five thousand bits of storage capability. Following the closing of suitable switches to enable the electronics of the controller 78 and the positioning system, the apparatus is preferably "initialized" as indicated by function block 252. In general terms, this involves driving the gripper device 50 to a "home" position and resetting each of the axial storage registers to zero. It can be seen from the foregoing description with reference to FIGS. 1 and 11 that the axial storage registers 200 do not register absolute position within the cubical work space but rather the instantaneous difference between a command position and actual position. Accordingly, it is necessary to initialize or zero the registers prior to the beginning of a work transfer process.

As indicated by function block 254 in FIG. 13, the system enters a "stand-by condition" following the initialization and from the stand-by condition the system may be placed in any of several operating modes according to the function selected in the mode selection block 256. As previously indicated, mode selection is preferably carried out by means of the controller panel and includes a training mode, indicated by function block 258, a manual mode of operation indicated by function block 260, and an automatic cycling mode as indicated by function block 262. Decision block 264 indicates that the automatic cycling mode 262 may only be selected if the system has been properly trained so as to have in computer storage the data which is necessary to execute the substantially repetitious series of movements called for in an automatic cycle mode.

All of the selectible modes represented by function blocks 258, 260, and 262 terminate by a return to the stand-by mode 254 from which other mode selections can be made.

FIG. 14 — INITIALIZING MODE FLOW DIAGRAM

Looking to FIG. 14, additional details of the initializing function represented by block 252 in FIG. 13 will be described. Once the initializing function is entered, the function block 266 indicates that the Z-axis position system is actuated to move the arm 42 to a home position which is typically a fully raised position. The signal that the arm 42 has been fully raised is generated by a limit switch as indicated in function block 268. As soon as this signal is generated, the process flows forwardly to function block 270 which involves resetting the Z-axis register 200 (FIG. 11) to zero.

Following this step, the function block 272 indicates that the X-axis positioning system is actuated to drive the gripper device 50 to the X-axis home position which, again, is typically at one extreme of lateral movement. The closure of a limit switch as indicated by function block 274 advances the process to function block 276 which involves resetting the X-axis register to zero, it being understood that this register is the counterpart of the Z-axis register 200, illustrated in FIG. 11.

Function blocks 278, 280, and 282 are then followed in sequence to establish the Y-axis home condition after which the system advances to the stand-by condition.

Figure 14:
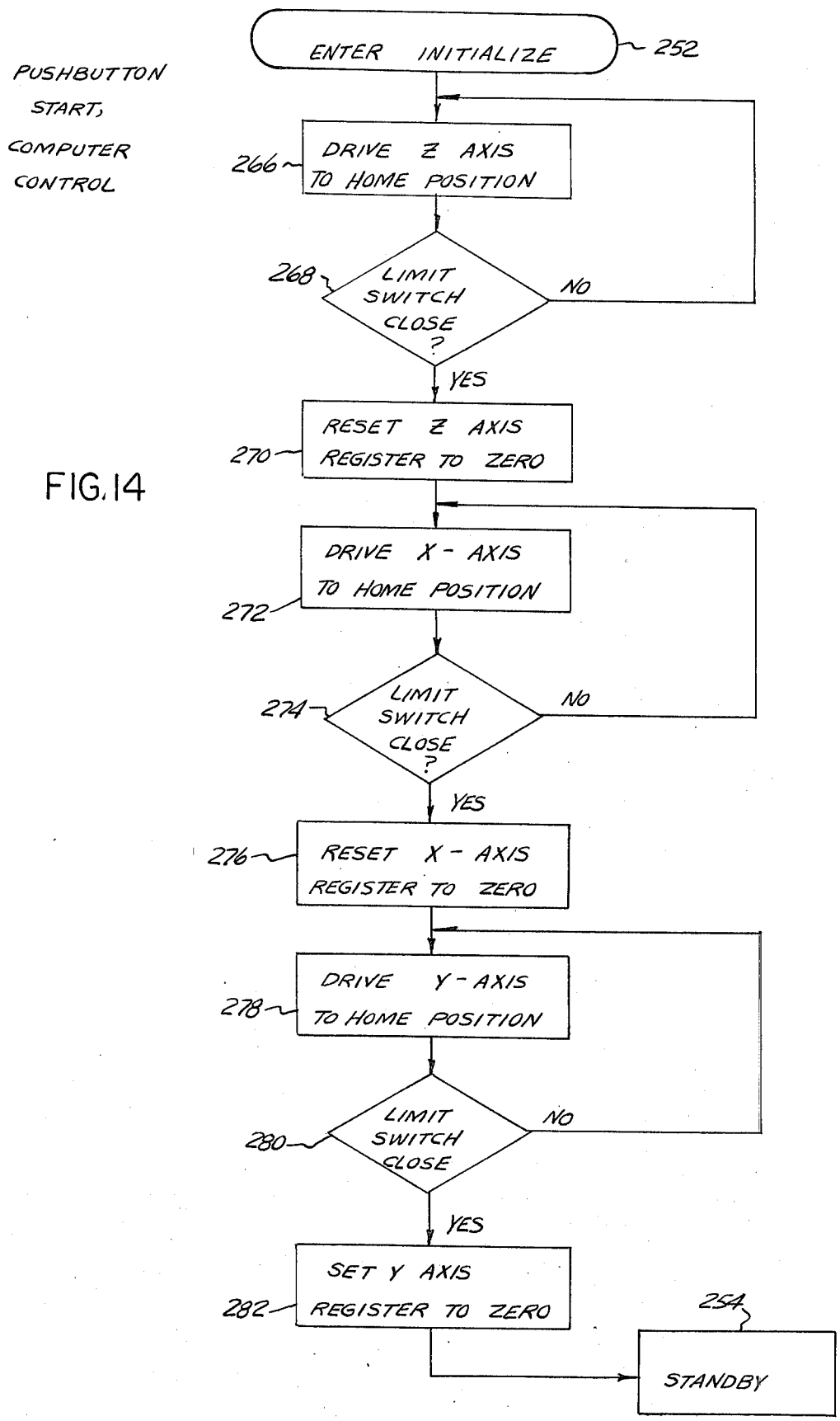
FIG. 14 is a flow chart of a specific program which may be carried out under computer control.

It is to be understood that the mode of operation represented by the function blocks of FIG. 14 may be carried out manually, but are preferably carried out in response to a stored program. This stored program may take the form of a punched numerical control tape or it may be stored in the memory of a digital computer. The preferred implementation is, of course, the stored program digital computer since this implementation, and a minimization of input media handling during operation of the system. In other words, the computer implementation permits one to simply push a button on the controller 78 to call the initializing routine from memory and drive the X, Y, and Z axis positioning system to the home condition. While FIG. 14 indicates that the three axes are typically handled separately and in sequence, it is possible to carry out the sequence in a generally simultaneous fashion as will be apparent to digital computer programmers who are skilled in that art.

FIG. 15 — TRAINING METHOD

Figure 15:
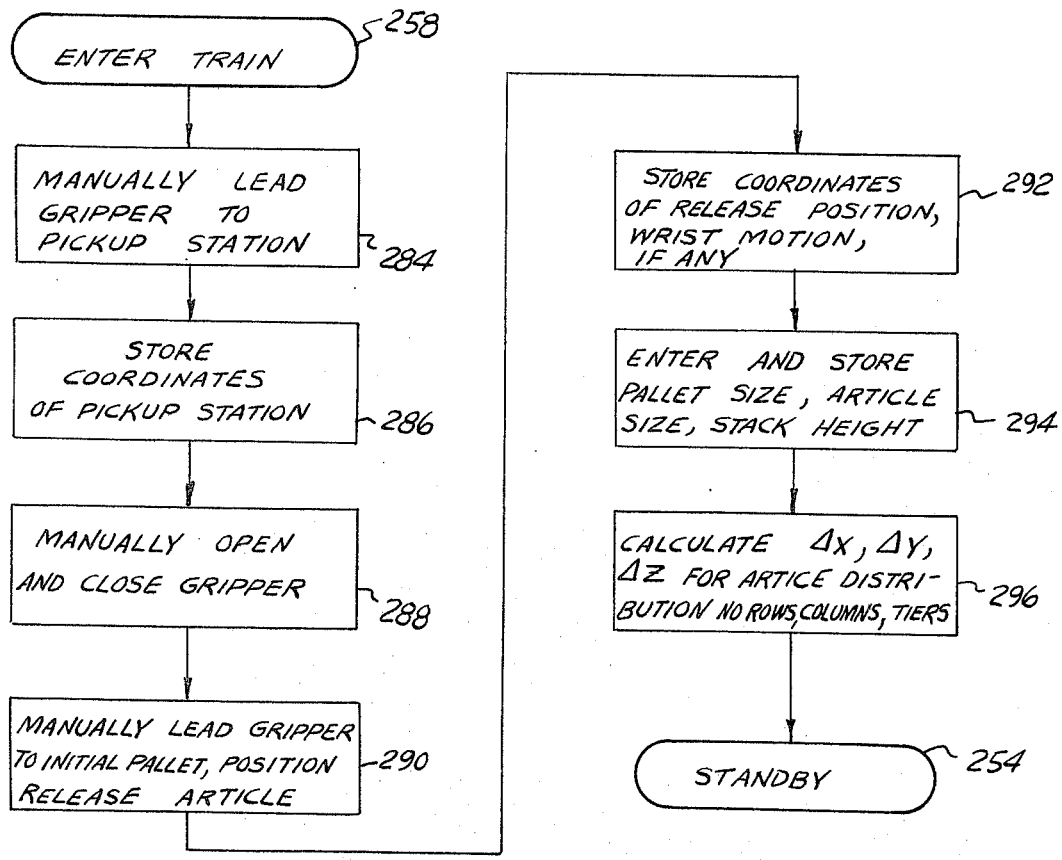
FIG. 15 is a flow chart of a training procedure which must be carried out before automatic cycle control can be selected in the subject device.

FIG. 15 indicates in generalized terms the functions which are carried out during a training process; i.e., a process which is executed to generate and enter data into computer memory storage regarding the coordinates of the pick-up station, the release station, the wrist action, if any, and the physical parameters of the article being handled and the stacking configuration which is desired.

More specifically, the training mode 258 begins with the manual operation of the positioning system servo loops to lead the gripper assembly 50 to the pick-up station represented by the work table 68. This is represented by function block 284. Once the gripper has been placed in a position within the insert 72 of the work table 68 and with the lower jaw 54 within 1/16 to 3/16 inch of the level of the work table 68 (the interior working surface of the jaw must be flush with surface 68 or below, it must not be above), the coordinates of the gripper are stored in the memory of the control computer in controller 78 as indicated by function block 286. The gripper jaws 52 and 54 are, of course, opened and closed to grasp any article to be picked up as indicated by function block 288. The gripper assembly 50 is then manually directed to an initial position on the pallet, such as the far righthand corner, wherein two sides of a generally rectangular article, such as the banded lumber bundle 66, are aligned with the sides of the pallet 76 and the article is released by causing the lower jaw sector plates to be withdrawn from a position under the article. This is indicated by function block 290. At this time function block 292 indicates that the coordinates of the gripper assembly 50 are again entered into the computer program along with the occurrence of any wrist rotation which may have occurred. Again, wrist rotation information is simply entered in terms of a YES or NO function since the degree of wrist rotation is mechanically preset in the actuator 62 as previously described with reference to FIGS. 8 through 10.

Figure 17A:
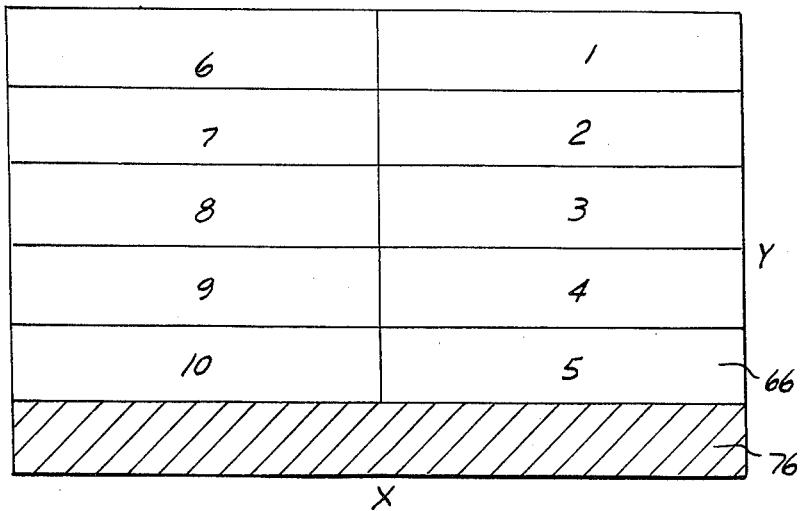
Figure 17B:
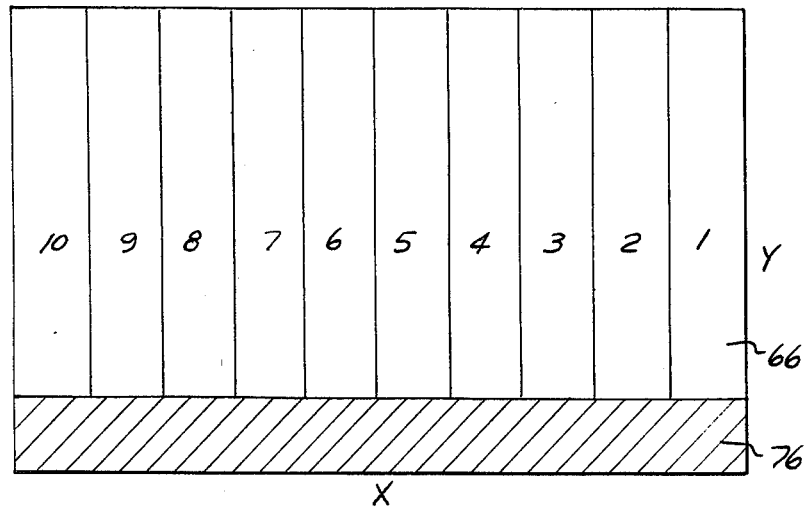

Function block 294 indicates that the next step is to enter into computer storage data regarding the pallet size, the article size, including length, width and height, and the desired stack height. This is carried out by physical measurement of the articles and the pallet and the entering of digital data by way of the control panel on the controller 78 into the memory or other storage facility of the computer therein. From this data the computer enters function block 296 to calculate the necessary increments of X and Y-axis motion necessary to properly distribute the articles as they are sequentially transferred from the work table 68 to the pallet 76 in order to first substantially cover the rectangular area of the pallet itself and then to stack the articles upon one another. It can be seen from the stacking pattern of FIG. 17a that the Y-axis coordinate positions for the release position are incremented between articles by the depth of the article itself until five articles have been arranged in a uniplanar row. The computer then calculates the fact that the depth of the article is such that a sixth article on the pallet 76 would overhang the side of the pallet and, accordingly, the X-axis is incremented by the length of the article. Incrementation along the X-axis results in a reversion to the original stored Y-axis position and the sixth article is placed along side of the first article, but to the left thereof as indicated in FIG. 17a. The Y-axis is again reincremented to distribute the next four articles as indicated in FIG. 17a.

FIG. 17a is, of course, representative of only one distribution pattern and it is a function of the stored program to select the pattern which best suits the articles in view of the dimensional data thereof as well as the dimensional data of the pallet.

The calculation and storage of all of the X, Y, and Z-axis increments are placed in storage according to function block 296 and the control system returns to the stand-by mode 254.

FIG. 16 — AUTOMATIC CYCLE MODE

Figure 16:
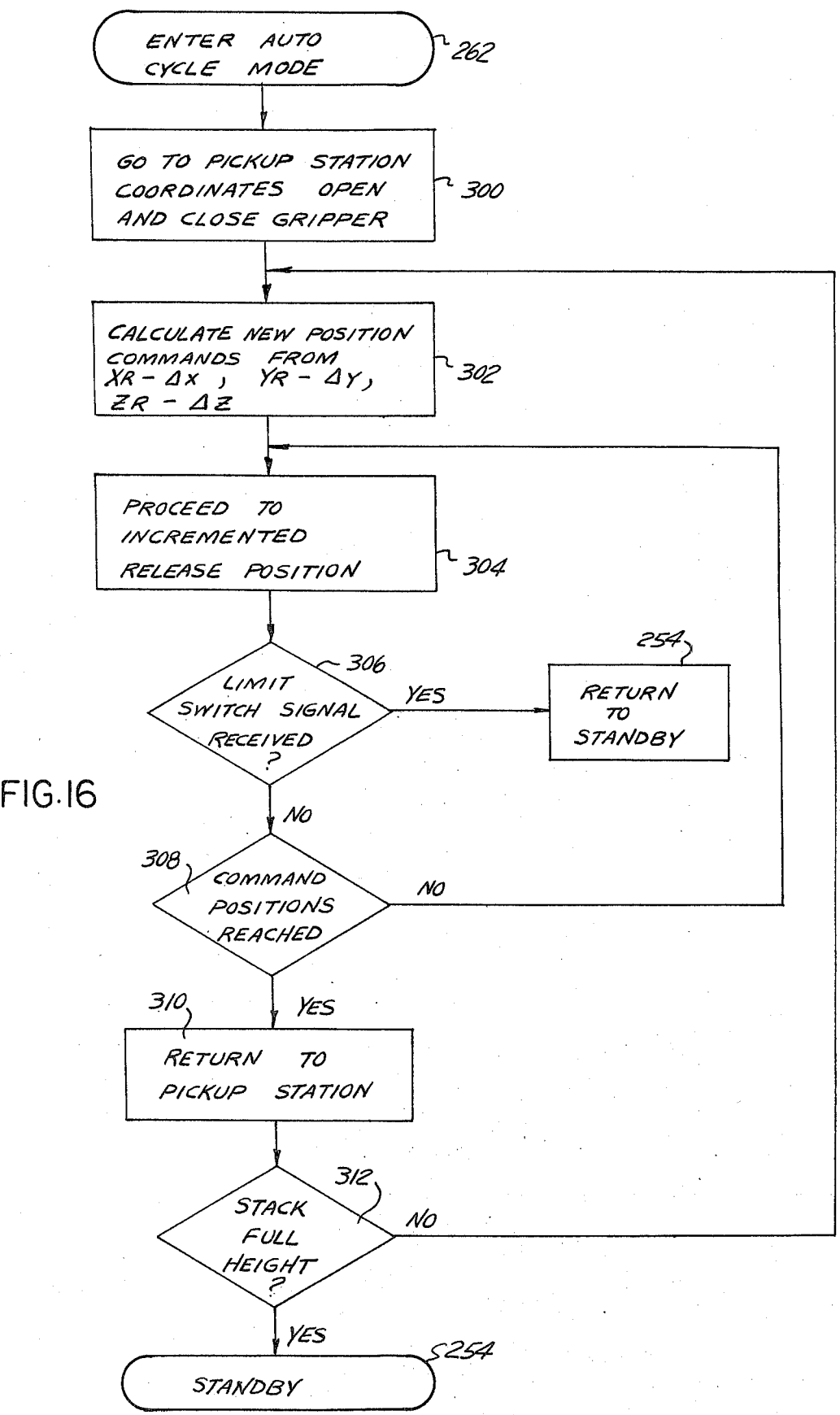
FIG. 16 is a flow chart of an automatic cycle program which may be carried out under computer control to produce a stacking operation; and, FIG. 17 is a representation of various stacking patterns which may be selected in operation of the subject device.

Looking now to FIG. 16, a generalized flow diagram of an automatic cycle mode 262 is indicated. The control system must, of course, be trained in accordance with the disclosure of FIG. 15 before the automatic cycle mode may be entered. However, once this condition is satisfied, the system may be caused to cyclically and repetitiously progress through the transfer of a series of articles from the work station to the release station, the aforedescribed incrementation of release positions being carried out in a systematic fashion. This begins with function block 300 which involves moving to the pick-up station and opening and closing the gripper to grasp an article. Function block 302 is then carried out to calculate the new position commands by subtracting the X, Y, and Z axis increments calculated in function block 296 from the release position coordinates of the first article transfer to the pallet during the training method. As previously described, $\Delta X$ and $\Delta Z$ are zero for articles two through five, assuming the stacking configuration of FIG. 17a, and $\Delta Z$ is zero through article ten. Once these position commands are calculated, the process advances to function block 304 which involves transferring the position commands to the servo system for causing displacement of the gripper to the newly defined release position.

As indicated by function block 306, the receipt of any limit switch signals including a signal from probe 124, operates to return the system to the stand-by mode 254 since the calculated position commands are out of bounds or some other difficulty is encountered. On the other hand, if no such trouble indicating signals are received, the decision block 308 is entered to determine when the command positions for the three axes are reached. Once they are reached, the article is released and the gripper is returned to the pick-up station as indicated by function block 310. Decision block 312 follows to determine whether the full stack height has been reached and if the stack height has been reached, the stand-by mode 254 is entered. If the stack height has not been reached or exceeded, the process returns to function block 302 during which new release coordinates are calculated and used for the next transfer.

It will be apparent to those skilled in the data processing and programming arts that the actual writing of instructions and the preparation of an object program media to be fed into a digital computer in accordance with the instructions of FIG. 16, is a routine and straightforward matter, the choice of language and interinstruction complexity being determined by the particular computer which is used and the preferences of the programmer. It is also to be understood that the process of FIG. 16 may be precalculated and suitable instructions entered into a "hard" program media, such as a punched tape, and the resulting tape fed through a conventional numerical control tape reader of a tape which is well known in the art. Again, the preferred implementation is the software and digital computer implementation since this offers the greatest advantages in terms of programming ease and flexibility.

Looking now to FIG. 17, the various portions thereof indicated stacking patterns which may be followed. FIGS. 17a and 17b are to be taken in combination to represent odd and even layers respectively of tiers of articles stacked on a pallet 76 to produce a stable load which will not be subject to spontaneous disassembly on fork truck handling or the like. It can be seen in FIG. 17b that the articles 66 are arranged orthogonally relative to the articles on the first and third layers illustrated in FIG. 17a. This interleaving can be seen to contribute greatly to the resulting stability of the load. It will be noted in FIG. 7a and FIG. 7b that a small area of the pallet 76 is left uncovered, it being determined in advance that the location of articles in this area would cause the articles to overhang the side of the pallet 66.

Figure 17C:
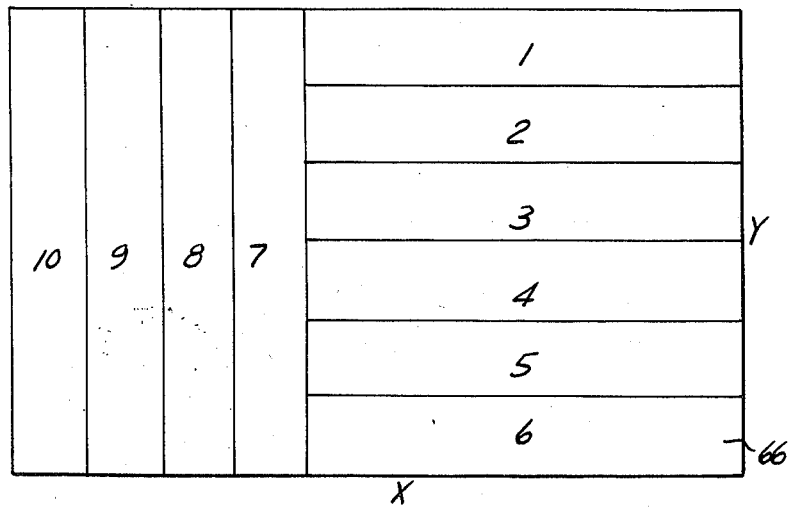
Figure 17D:
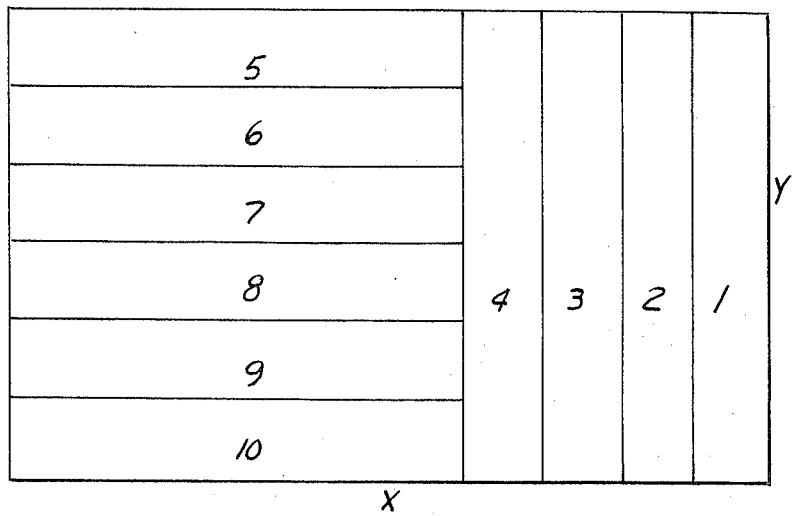

FIGS. 17c and 17d illustrate another stacking pattern which results in the maximized use of space on the pallet 76 as well as the complex interleaving of articles between odd and even layers. It should be observed that articles five through ten of FIG. 17d overlie articles one through five on the next lower and next higher layers as indicated in FIG. 17c.

Figure 17E:
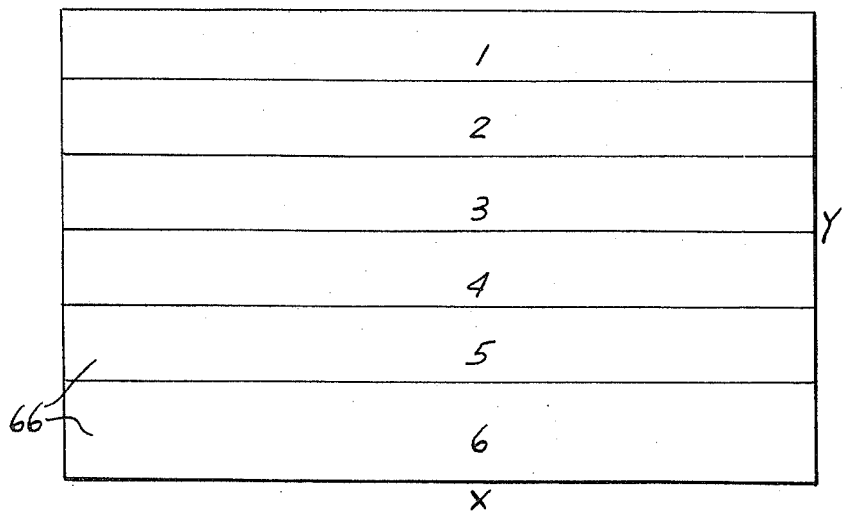
Figure 17F:
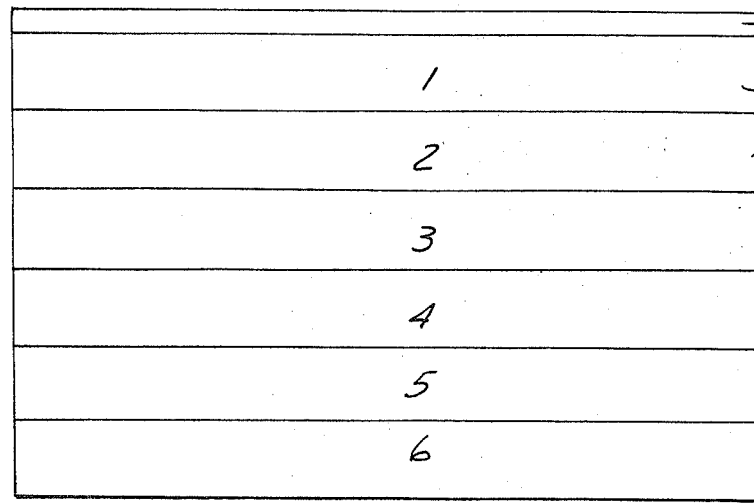

FIG. 17e and 17f illustrate another interleaving pattern wherein the articles of even layers are offset along the Y axis by one-third of the depth of the articles relative to the articles of the even layers. This is a matter of necessity where the articles are of such length as to preclude the 90° rotation of articles as between layers; i.e., the circumstance wherein the length of the articles is greater than the Y-dimension of the pallet.

It is to be understood that the invention has been described with reference to an illustrative embodiment and that the foregoing description is to be construed as illustrative rather than limiting in sense. It is also clear that while the invention has been described as a palletizing tool, it may also be applied to de-palletizing operations and other transfer functions.

The embodiments of the invention in which an exclusive property or privilege is claimed are defined as follows:

1. Article transfer apparatus comprising: article gripper means for selectively engaging and supporting articles for transfer thereof from a first station to a second station, said gripper means having relatively opposing and vertically displaceable upper and lower jaws; support means for said gripper means and including a vertically depending, rigid arm having said gripper means attached to the lower end thereof; said gripper means including means for producing selective displacement of said lower jaw along a horizontal plane about a vertical axis between an article engaging position and an article releasing position; positioning means responsive to respective position command signals to produce controlled linear displacement of said gripper means along a first vertical axis and along second and third mutually perpendicular horizontal axes; and, controller means for selectively producing first, second, and third position command signals and applying said signals to said positioniong means to cause displacement of the gripper means along the first, second, and third axes, respectively, and motive power means for providing selective relative vertical displacement between said upper and lower jaws for grasping and releasing articles.

2. Article transfer apparatus as defined in claim 1 further comprising a substantially rigid and vertically depending support frame secured to said rigid arm and carrying the upper and lower jaws, the lower jaw being connected to the frame in substantially fixed vertical relationship therewith, the motive power means operating exclusively to produce vertical displacement of the upper jaw relative to the frame and to the lower jaw for grasping and releasing articles.

3. Article transfer apparatus as defined in claim 2 including mounting means for attaching the vertically depending rigid frame to the rigid arm, said mounting means being constructed and arranged to permit a limited degree of vertical decoupling between the rigid frame and the rigid arm whereby reaction of the upper jaw in moving relatively downwardly against a fixed surface tends to raise the lower jaw and the rigid frame to the degree of vertical decoupling provided.

4. Article transfer apparatus as defined in claim 1 including pressure control means for limiting the grasping pressure exerted by the upper and lower jaws on an article disposed therebetween, the pressure control means including means for sensing the electrical energy consumed by the motive power means in producing relative vertical displacement between the jaws.

5. Article transfer apparatus as defined in claim 1 further including adjustable limit switch means for establishing respective first and second limits of relative upper and lower jaw travel corresponding to open and closed positions thereof relative to one another.

6. Article transfer apparatus as defined in claim 1 wherein said position means includes first, second, and third servo control loops responsive to said position command signals for producing error signals representing the difference between the commanded position of the gripper means in a triaxial coordinate system and the actual position of the gripper means in said system and respective motion power means for receiving the error signals and producing linear displacements along the respective axes thereof.

7. Article transfer apparatus as defined in claim 6 wherein each of said servo control loops comprises a digital pulse register for receiving a number of commanded signal pulses, the specific number of which represents a total displacement to be carried out by the positioning means along a given axis, the controller means including means for producing command signal pulses in selected quantities for application to said counters.

8. Apparatus as defined in claim 7 including for each axis of displacement, means for producing digital signal pulse quantities representing predetermined increments of displacements of the gripper means relative to said triaxial coordinate system, the sources being operatively connected to the pulse counters to produce an error signal representing the difference between the commanded position of the gripper means and the degree of displacement toward the commanded position from the actual position of the gripper means.

9. Apparatus as defined in claim 1 including means defining a reference position of the gripper means relative to each of the three mutually perpendicular axes of displacement, the controller means including means for causing the gripper means to be displaced to the reference position upon initial operation of the transfer apparatus.

10. Article transfer apparatus as defined in claim 1 wherein said controller means includes storage means for receiving and storing a programmed sequence of displacements for the gripper means relative to said axes, the storage means being selectively actuable to produce the position command signals according to said sequence.

11. Article transfer apparatus as defined in claim 1 wherein said controller means further includes manual control means for effecting manual displacement of the gripper means along each of the three axes of displacement.

12. Apparatus as defined in claim 11 wherein the controller means further includes means whereby the displacements of the gripper means which are produced by operation of the manual control means are stored in said storage means to permit manual training of the controller means for subsequent automatic operation.

13. Apparatus as defined in claim 12 wherein said controller means further includes means for incrementally varying the coordinate position of the gripper means at said second station according to the size of the article being transferred.

14. Article transfer apparatus as defined in claim 1 wherein the gripper means further includes a support surface probe depending vertically therefrom and adapted to produce a control signal upon detection of a support surface immediately below and adjacent the gripper means, said control signal being effective to override said controller means in altering the commanded position of the gripper means along the vertical axis.

15. Article transfer apparatus as defined in claim 1 including means for defining a work area immediately adjacent and around the gripper means and substantially contiguous with the limits of travel thereof along the three axes, and emergency shutoff means arranged around the horizontal boundaries of said work area and operative to deenergize the positioning means.

16. Article transfer apparatus as defined in claim 1 wherein the support means further includes selectively energizible pivot means for permitting limited pivotal displacement of the gripper means relative to the rigid arm and about a vertical axis.

17. In an article transfer system a gripper assembly comprising: a vertically extending support frame, lower jaw means mounted on the frame at a fixed vertical position, said lower jaw means including first and second jaw elements disposed in a substantially horizontal plane, and means for selectively rotating said jaw elements in substantial synchronism to extend and retract said jaw elements between an article engaging position and an article releasing position; first bidirectional motive power means for selectively producing displacement of the lower jaw means in a horizontal plane between said article engaging position and said article releasing position, upper jaw means mounted on the frame in vertically opposed relation to the lower jaw means when the lower jaw means is in the article engaging position, and second bidirectional motive power means for selectively producing displacement of the upper jaw relative to the frame along a vertical axis.

18. Apparatus as defined in claim 17 wherein the second motive power means includes a bidirectional electric motor, a screw shaft connected to be driven by the motor and a traveler nut operatively engaged with the screw shaft and connected to the upper jaw for driving the upper jaw along the vertical axis.

19. Apparatus as defined in claim 18 including grasping pressure control means comprising current sensing means connected between said second motive power means and a source of electrical supply for deenergizing the second motive power means in response to a predetermined level of energizing current.

20. Apparatus as defined in claim 17 wherein said jaw elements are sector-shaped and include meshing gear edges, said drive means being operatively connected to only one of said gears whereby the other of said sectors is driven through said one sector element.

21. Apparatus as defined in claim 17 including first and second limit switches carried by the support frame to be operatively actuated at predetermined upper and lower limits of travel of the upper jaw to deenergize the second motive power means.

22. Apparatus as defined in claim 21 including means for adjusting the vertical positions of the limit switches.

23. Apparatus as defined in claim 17 including a vertically depending rigid support arm, means interconnecting the gripper assembly support frame and the support arm, said means permitting vertical displacement between the gripper assembly and the rigid support arm.

24. Apparatus as defined in claim 23 including third bidirectional motive power means for providing limited angular displacement of the gripper assembly relative to the support arm about a vertical axis.

25. Apparatus as defined in claim 23 including closed loop positioning means responsive to a position command signal for positioning the gripper assembly and the vertical support arm along a vertical positioning axis, an open-loop control means for actuating and deactuating the operation of the second motive power means for control of the gripper jaws.

* * * * *